Oct. 22, 1935.  N. M. MARSILIUS  2,017,913
MILLING MACHINE
Filed July 9, 1934     5 Sheets-Sheet 1

INVENTOR.
Newman M. Marsilius
BY Christian M. Newman
ATTORNEY

Oct. 22, 1935.  N. M. MARSILIUS  2,017,913
MILLING MACHINE
Filed July 9, 1934  5 Sheets-Sheet 4

INVENTOR.
Newman M. Marsilius
BY
Christian M. Newman
ATTORNEY

Oct. 22, 1935.  N. M. MARSILIUS  2,017,913
MILLING MACHINE
Filed July 9, 1934   5 Sheets-Sheet 5

INVENTOR.
Newman M. Marsilius
BY
Christian M. Newman
ATTORNEY

Patented Oct. 22, 1935

2,017,913

UNITED STATES PATENT OFFICE 2,017,913

MILLING MACHINE

Newman M. Marsilius, Bridgeport, Conn., assignor, by mesne assignments, to The Bridgeport Bronze Company, Bridgeport, Conn., a corporation of Connecticut Application July 9, 1934, Serial No. 734,317

5 Claims. (Cl. 90—15)

This invention relates to new and useful improvements in milling machines, and more particularly machines adapted for key-way milling of axles, crank shafts, electric motor connection shafts, as well as various forms of flat and face milling.

The machine is distinguishable from other types of milling machines in that it employs a relatively long reciprocatory table upon which the work is mounted, and two cutter arbors on which one or more rotary cutters are positioned.

The machine is adapted to carry a series of pieces of work on each end portion of the table. If this work is shafts requiring key-way and face milling, several of them can be secured longitudinally upon the top of each end portion of the table and at a slight angle with respect to the top face thereof, and each in alignment with the cutters mounted on the arbor.

The particular machine shown herein is chucked to accommodate four pieces of work on each end portion of the table and four millers on each arbor, one for each piece of work. In practice one set of cutters is in productive operation while the table is moved in one direction, during which operation the work is being removed and new work replaced on the other end portion of the table. With the return movement of the table, the second set of cutters is brought into operation with the work just positioned on the table and during the milling of this work the four work pieces mounted on the first mentioned end of the table are being removed and new work placed thereon.

This construction therefore produces a machine which is capable of continuous multiple production, a series of pieces of work being produced with each forward movement and each return movement of the table. The machine includes three relatively large cams, one of which serves to reciprocate the table and the other to feed the cutter heads vertically and with respect to the work. The work pieces or shafts are placed on the table longitudinally and at a very slight angle with respect to the top face of the table, which is necessary with these particular shafts whose ends are tapered and wherein it is desired to produce a key-way of a uniform depth. The cutters are timed to first move down into engagement with the tapered end portion of the work pieces which are fed forward with the longitudinal movement of the table, producing a key-way or slot in each. Upon the completion of the operation, the cutters are raised out of engagement with the work during the return movement of the table.

These and other novel features are embodied in my improved machine, as will be apparent from the following description of the same and the accompanying drawings, wherein Fig. 1 shows a plan view of my improved milling machine, partially broken away, having four pieces of work, shafts to be milled positioned therein;

Figure 1:
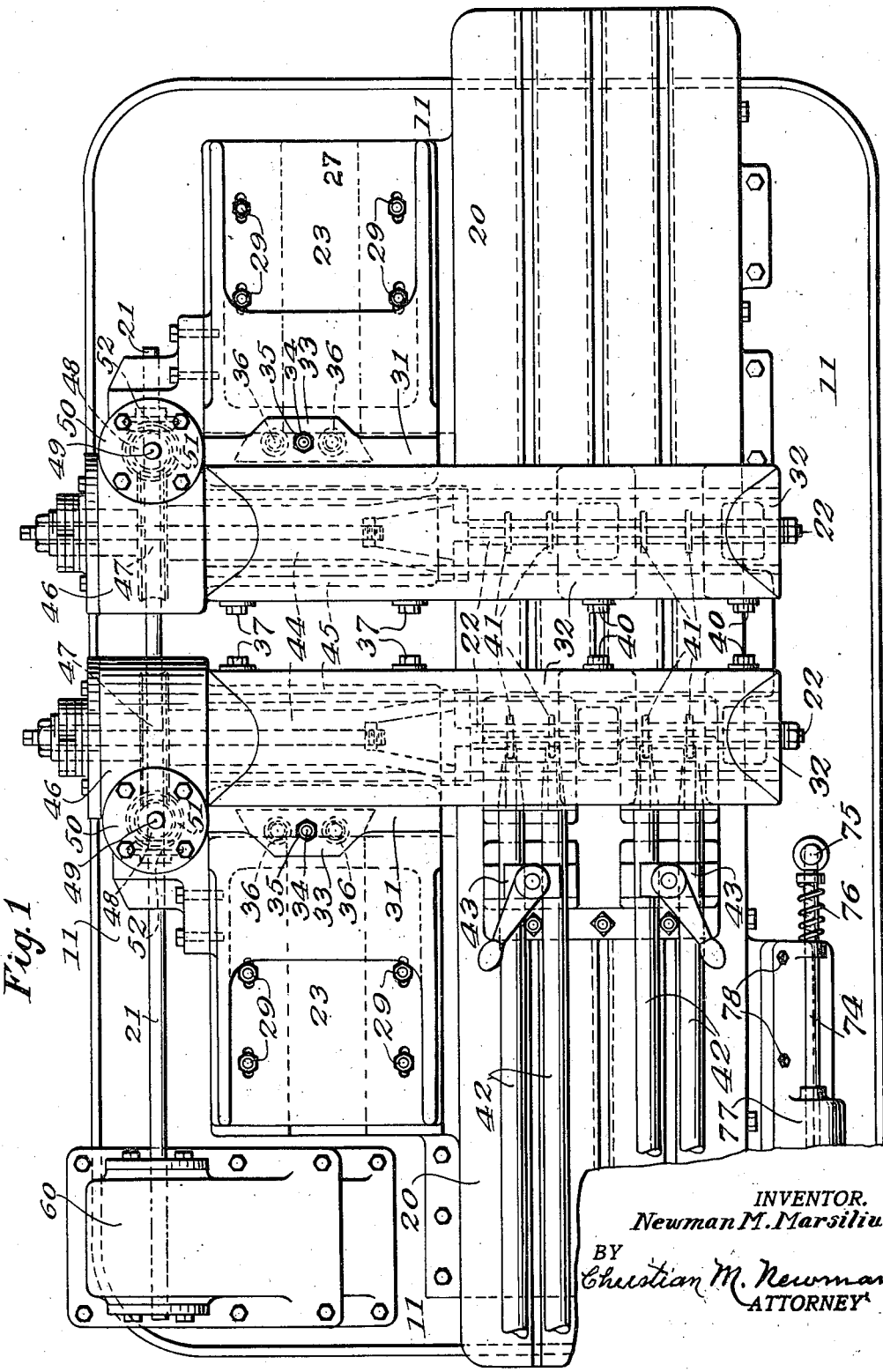

As will be noted, the machine is of a duplex type, geared to be driven from a single motor by two lines of drives, one for reciprocating the work table and the other to operate suitable gearing whereby the two cutter arbors are alternately operated, first upon stock carried on one end portion of the table and then upon work pieces secured to the other end portion. The machine shown in the drawings is equipped to mill four pieces of work at a time of the particular class shown, but it will be obvious that by suitable modifications of the chucking means a greater or lesser number of work pieces can be handled in substantially the same manner and in the same length of time.

The machine is designed for high production and requires but a single operator who is engaged in removing the finished work from and replacing new pieces on the same end portion of the table, while the work on the other end of the table is being passed under the milling cutters. When these pieces are finished and with the return movement of the carriage, the new work pieces to be milled which have just been placed in position are fed forward with the return movement of the carriage, and at which time the attendant is free to give his attention to the releasement of the work previously performed. If more than one key-way is to be cut in the shafts, additional heads may be provided.

While it is true that work to be performed on this machine can be secured upon the bed horizontally with the face thereof so as to produce uniform depth of cut, yet since the particular type of automobile driving shafts shown in the drawings have a slightly tapered end portion to receive the ends of a bevelled gear forming a part of an automobile drive mechanism, it is necessary that the grooves or splines therein be cut on an incline. Therefore provision is made in my machine and the chucks therefor, whereby the shafts are supported at a slight incline or angle with respect to the travel of the table, and whereby the horizontal cutting movements of the heads are in line with the movement of the table.

It will also be apparent from the construction of my machine that after a cut has been made, the cutter can be quickly raised out of the cut and is not dragged back through the cut while the table moves back to its original starting position. This obviously is an important feature from a practical point of view as whenever you have a cutter backed through a groove that has been cut, a tearing action takes place, due to interference by chips and consequently the cutters are dulled and subjected to wear.

Referring in detail to the characters of reference marked upon the drawings, 10 indicates the base which includes a large casting of suitable size and proportion, forming a dish-shaped chip pan 11 on which the bed 12 is positioned, carrying the principal operative parts of the machine. This base includes a chamber 13 and two gear boxes 14 and 15 in one end portion, said boxes being provided with removable cover plates 16—16 whereby access may be had to the gears for the purpose of changing the feeds and speeds.

17 represents a centrally positioned motor for driving the machine through the before mentioned change speed gearing which I will designate as 18 in the box 14, and as 19 in the box 15. The gearing 18 in the box 14 serves to reciprocate the table 20 while the gearing 19 is connected to drive the shaft 21 through which the two cutter arbors 22—22 are operated. The two sets of drives herein referred to are each provided with separate clutch mechanisms for starting and stopping the respective drives, as will again be referred to.

The two cutter arbors 22—22, with their drive gearing and supporting means, are alike in construction, except that one is a right and the other a left, and mounted to face each other and connected to be driven by a common shaft 21. I will therefore use similar characters of reference to indicate like parts of the two cutter units.

Figure 3:
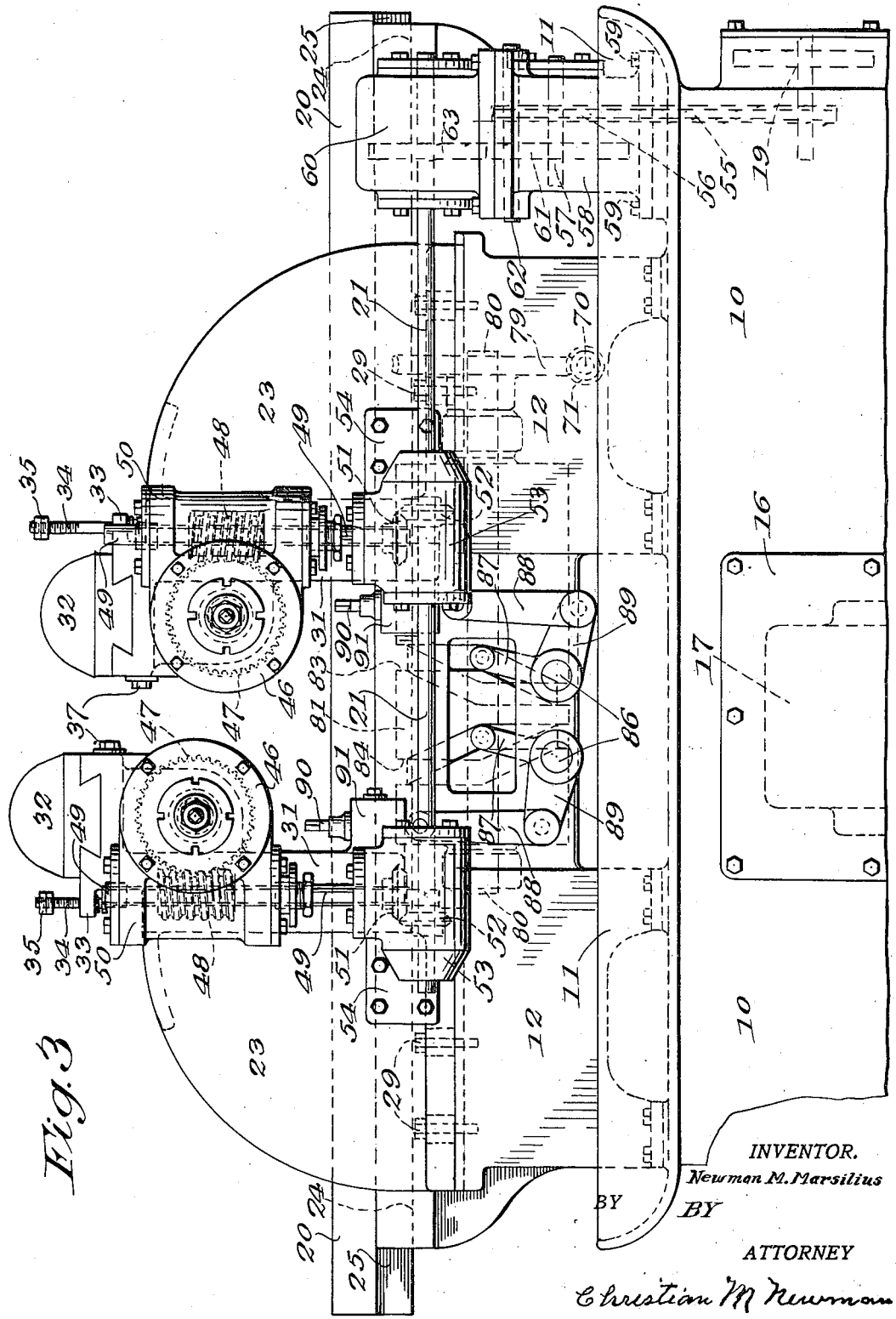
Fig. 3 shows a further or rear side elevation of the machine as seen from the opposite side from that shown in Fig. 2, no work being shown positioned on the machine.
Figure 4:
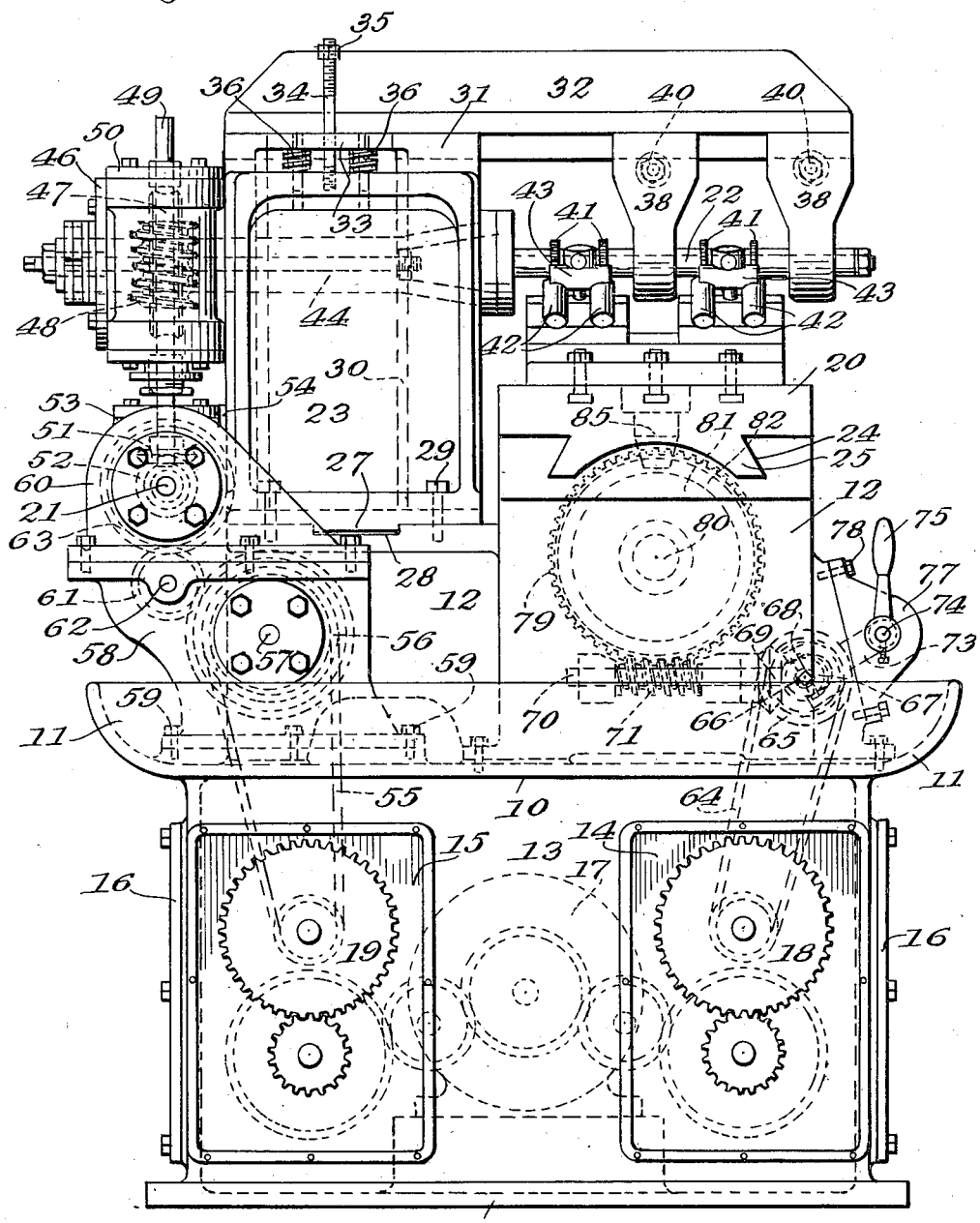
Fig. 4 is an end elevation of the machine, as seen from the left in Fig. 1, and including work pieces secured thereon.

The machine bed 12 is designed to support two columns 23—23 and the work table 20 having ways 24 adapted to reciprocate back and forth in corresponding ways 25 in the bed 12 during milling operations. The columns are mounted in aligned and spaced relation on the machine bed by means of bolts 26, see Figs. 1 and 3, the columns being provided with longitudinal rib 27 to engage corresponding ways 28 in the top of the bed whereby the columns may be adjusted to and from each other and secured in position by screws 29 that engage the top of the bed. Each of these columns are provided with a vertical dovetail way 30 in their adjacent faces to guide and support a vertically movable slide 31 which in turn supports the cutter arbor 22, the cutter arbor supporting arm 32 and a portion of the drive mechanism for the said cutter arbor.

Referring to Fig. 1. it will be seen that the top end of the slide 31 is provided with a right angle extension 33 that projects over the dovetail way 30 of the column, a stop screw 34 being secured in said way and extending freely through the extension and provided thereon with nuts 35 to limit the movement of the slide. In this respect it will also be seen that springs 36 are mounted between the extension of the slide and the top of the upright to counterbalance the weight of the slide.

Figure 5:
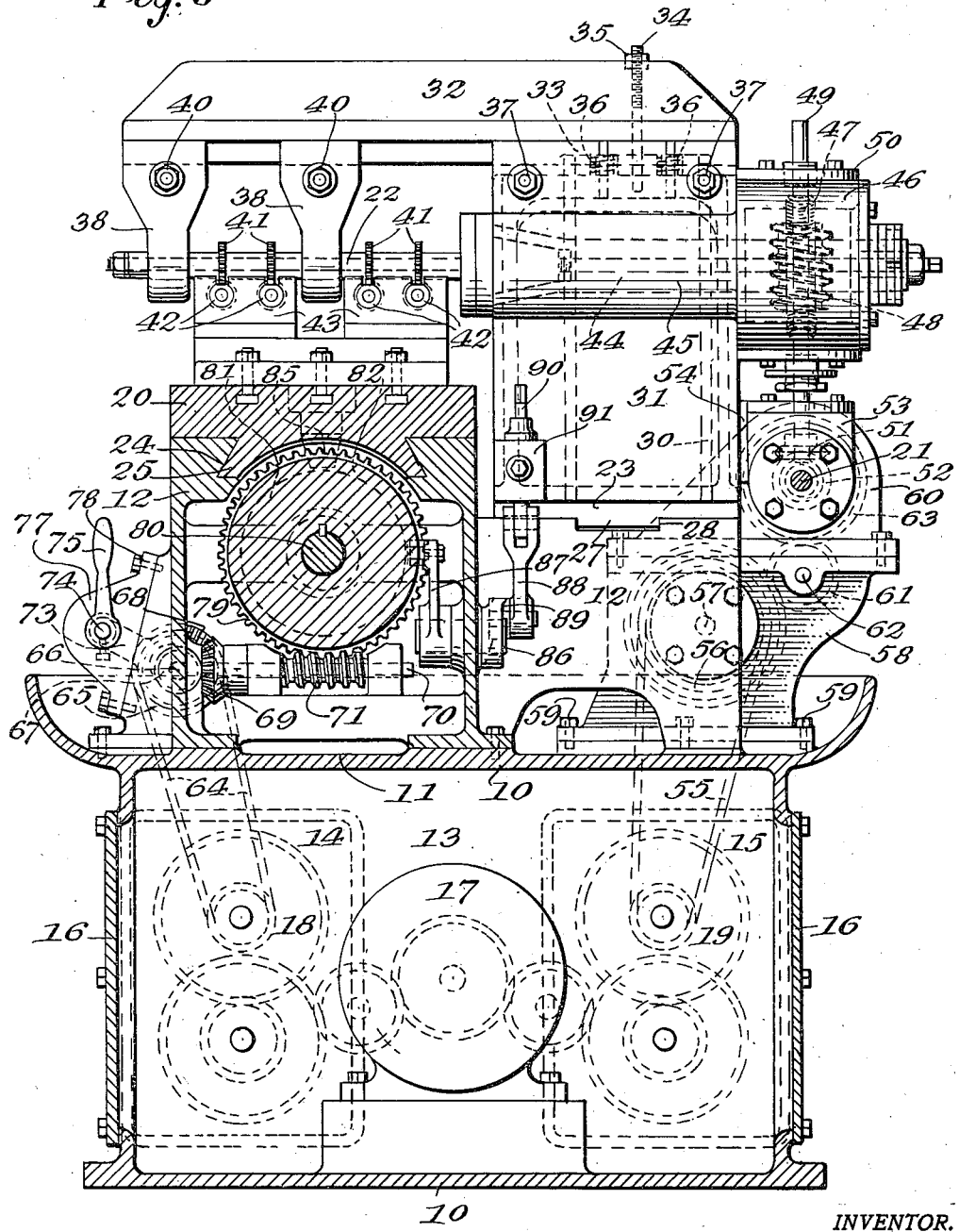
Fig. 5 shows a central vertical cross section through the machine, taken on line 5—5 of Fig. 2.

The cutter arbor supporting arm is adjustably mounted in the top of the slide 31 and secured thereto by means of set screws 37, see Fig. 5, so as to form an integral unit with the slide and adapted to be moved up and down therewith. Suitable depending aligned arbor supports 38 are secured to the extended portion of the arbor supporting arm which form bearings for the cutter arbor, and as will be seen are made adjustable thereon, see Figs. 2 and 5 by means of a slot 39 and a set screw 40, this adjustment obviously being to better accommodate different pieces of work and their required positions upon the reciprocatory table. The arbor is obviously provided with one or more cutters 41, according to the class and number of pieces of work to be operated upon. The work pieces, which I will designate as 42, in the present instance are automobile drive shafts.

43 represents work holders or fixtures which are secured to the table and serve to support the work. These fixtures obviously are more or less special and may have to be changed somewhat in order to accommodate different shapes of work pieces to be mounted and carried by the table.

From the foregoing it will be seen that the machine, as designed, serves to not only feed the work to the cutters but that the cutters are also fed to and from the work; that is they are moved into position for cutting operations performed when the work is fed against the cutters and automatically raised and moved away from the work piece when the milling operation has been completed.

The cutter arbor is socketed in a spindle 44 mounted in an elongated bearing 45 formed on the front side of the slide and extends out into a housing 46 on the side of the slide and the back of the machine. A worm gear 47 is mounted on this spindle within the housing 46 and meshes with and is driven by a worm 48 secured upon a vertical shaft 49 journaled in an associated chamber 50 of the housing 46 also supported by the slide, the said worm being slidably mounted upon the shaft 49 so as to permit vertical movement of the slide with respect to the shaft during the rotation of the latter.

Upon the lower end of this shaft 49 I provide a bevelled gear 51 that meshes with and drives a similar bevelled gear 52 on the horizontal drive shaft 21 which serves to operate the two cutter arbors through like gearing. The bevelled gears 51 and 52 are enclosed in a suitable housing 53 having a flanged portion 54 that is bolted to the column 23. The shaft 21 is operated in part through the gearing 19 in the box 15 which is connected by a sprocket chain 55 with a sprocket 56 on a short shaft 57 journaled in a hollow support 58 that is secured in the pan 11 by screw 59. This member 58 also serves to support a housing 60 in which the outer end of the drive shaft 21 is journaled.

Change speed gearing is employed between the short shaft 57 and the drive shaft 21 and consists of a relatively large gear on the said shaft 57 that meshes with and drives a smaller intermediate gear 61 on a short shaft 62. The said gear 61 meshes with and drives a third gear 63 on the before mentioned shaft 21. This gearing, together with the gearing 19 before referred to, obviously serves to complete the driving connection from the motor to the shaft 21, the cutter arbors and cutters mounted thereon.

Figure 2:
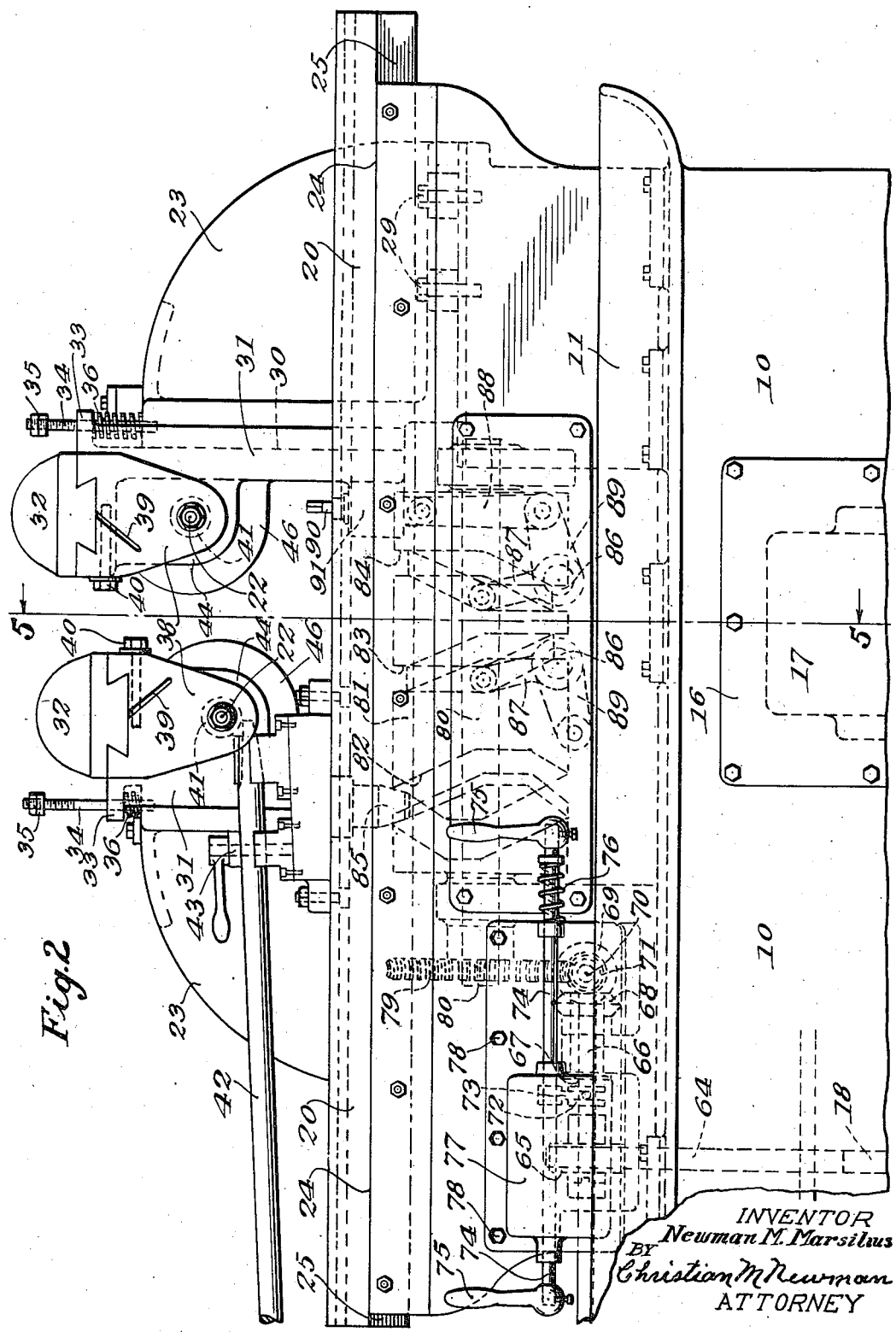
Fig. 2 shows a front elevation of the machine, as seen from the near side of Fig. 1, a small portion of the base of the machine being broken away.

As before stated, the power for operating the table is also derived from the motor 17 through the gearing 18, a sprocket chain 64 that drives a clutch-faced sprocket 65 loosely mounted on a shaft 66 journaled in bearings of the bed, see Fig. 2, and which also carries a clutch-faced sleeve 67 bearing a bevel gear 68 that meshes with and drives a similar bevel gear 69 on a shaft 70 that is journaled in the bed at a right angle to the before mentioned shaft 66 and carries a worm 71.

A clutch sleeve 72 is slidably mounted on the shaft 66 intermediate of the clutch face 67 and the clutch-faced sprocket 65 and is adapted to be operated by an arm 73 secured on a slide rod 74 bearing operating handles 75 whereby the clutch may be engaged and disengaged with and against the action of a spring 76 mounted upon the said slide rod 74. This clutch mechanism obviously serves to engage and disengage the drive for the gears 68 and 69 as in the starting and stopping of the machine. This clutch mechanism is enclosed by a cover 77 that is secured to the bed by screws 78, see Figs. 2 and 5.

The worm 71, see Fig. 5, carried by the shaft 70 meshes with and drives a larger gear 79 upon a shaft 80 journaled in the bed 12 longitudinally of the table 20. A cam drum 81 is mounted upon this shaft 80 and is provided with cam grooves 82, 83 and 84, the former of which, as will be seen from Figs. 2 and 5 is engaged by a stud 85, mounted in the carriage 20 and whereby the carriage is reciprocated backward and forward according to the throw of the path 82 of the cam, and which is designed to afford ample movement for the milling of such pieces as the machine is designed to accommodate.

The cam grooves 83 and 84 through their connections serve like purposes, namely to raise and lower the cutter slides 31 and since the connections from the cam drum for performing these operations are similar, I will use, as in the description of the other portions of the slide, arbor and cutters, like characters of reference in referring to the operating connections for the said slides. In this respect attention is called to Figs. 2 and 5 wherein it will be seen that I journal short shafts 86—86 in the bed adjacent to the cam drum and upon one end of each is mounted an arm 87 that carries a roller for engaging each of the cam grooves. A crank arm 88 is mounted upon the outer ends of each of these shafts and is connected by a link 89 with an adjustable stud 90 secured in a lug 91 formed on the side of the slide 31 and whereby the latter is reciprocated in its way through the action of the cam for the purpose of raising and lowering the cutter arbor support and cutter arbor, as in feeding the cutters into and from their work.

Having thus described my invention, what I claim and desire to secure by Letters Patent is:

1. A duplex milling machine comprising a base, a bed, a relatively long reciprocable table mounted upon one portion of the bed, two separate series of sets of work holders mounted on the table in spaced relation to each other, a pair of spaced-apart columns mounted on the bed and adjustable toward and from each other, a vertical movable slide mounted on each column and in spaced relation one to the other, a supporting arm adjustably mounted on each vertical slide and extending out over the table, a cutter arbor and cutters carried by each arm and extending crosswise of the table, cam means for moving both slides and cutter arbors vertically, a single drive shaft for the two cutter arbors, change speed gearing between the drive shaft and cutter arbors, separate series of work holders mounted on the table for supporting work pieces, means for reciprocating the table in a manner to serve both sets of cutters in a way to permit them to cooperate upon the series of work pieces mounted on opposite end portions of the table.

2. A duplex milling machine of the class described comprising a base and a bed, a pair of spaced-apart columns mounted on the bed and adjustable toward and from each other, a vertically movable slide mounted on each column in spaced-relation one to the other, a supporting arm adjustably mounted on each vertical slide, a cutter arbor mounted on each arm, a single means for moving both slides and cutter arbors vertically, carried by each arm and each provided with rotary cutters to operate on separate series of work pieces, a relatively long reciprocable table mounted upon the bed, two separate sets of work holders mounted on the table in spaced relation to each other, one set positioned to serve one set of rotary cutters carried by one column and the other set positioned to serve the cutters of the other column so that work may be loaded in one set of work holders while the cutters are operating upon stock supported in the other set of work holders, means for reciprocating the table in a manner to serve the two sets of cutters in a way to alternately operate upon work mounted on opposite end portions of the table.

3. A duplex milling machine of the class described comprising a base and a bed, a pair of spaced-apart columns mounted on the bed and adjustable toward and from each other, a vertically movable slide mounted on each column in spaced-relation one to the other, a supporting arm adjustably mounted on each vertical slide, cutter arbor supports mounted on each arm, a cutter arbor mounted in the supports carried by each arm and each provided with rotary cutters to operate on separate series of work pieces, a relatively long reciprocable table mounted upon the bed, a single means for alternately moving the slides vertically and for reciprocating the table, two separate series of work holders mounted on the table in spaced relation to each other, one set positioned upon the table to serve one set of rotary cutters carried by one column and the other set positioned to serve the cutters of the other column so that work may be loaded in one set of work holders while the cutters are operating upon stock supported in the other set of work holders, means for reciprocating the table in timed relation to the feeding movements of the cutters to alternately serve the two sets of cutters.

4. In a duplex milling machine of the class described comprising a base and a bed, a pair of spaced-apart columns mounted on the bed and adjustable toward and from each other, a vertically movable slide mounted on each column in spaced-relation one to the other, a supporting arm adjustably mounted on each vertical slide, a cutter arbor mounted on each arm, and each provided with rotary cutters to operate on separate series of work pieces, a single means for moving both slides and cutter arbors vertically, a relatively long reciprocable table mounted upon the bed, a single means for alternately moving the slides vertically and for reciprocating the table, two separate series of work holders mounted on the table in spaced relation to each other, one set positioned upon the table to serve one set of rotary cutters carried by one column and the other set positioned to serve the cutters of the other column so that work may be loaded in one set of work holders while the cutters are operating upon stock supported in the other set of work holders, means for reciprocating the table in timed relation to the feeding movements of the cutters to alternately serve the two sets of cutters.

5. A duplex milling machine comprising a base, a bed, a reciprocable table mounted upon one portion of the bed, two separate series of work holders mounted on the table in spaced relation to each other, two spaced-apart columns mounted on the bed, a vertical movable slide mounted on each column and in spaced relation one to the other, a supporting arm adjustably mounted on each vertical slide and extending out over the table, a cutter arbor and cutters carried by each arm and extending crosswise of the table, cam means for moving both slides and cutter arbors, vertically, a single drive shaft for the two cutter arbors, change speed gearing for the drive shaft and cutter arbors, reduced speed gearing between the drive shaft and each cutter arbor, two separate series of work holders mounted on the table for supporting work pieces for the sets of cutters, means for reciprocating the table in a way to serve both sets of cutters.

NEWMAN M. MARSILIUS.